(12) United States Patent
Nelson et al.

(10) Patent No.: US 7,170,422 B2
(45) Date of Patent: Jan. 30, 2007

(54) PERSONAL PROGRAMMABLE UNIVERSAL REMOTE CONTROL

(75) Inventors: Terence J. Nelson, New Providence, NJ (US); Junichi Kanai, East Windsor, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 485 days.

(21) Appl. No.: 10/178,437

(22) Filed: Jun. 24, 2002

(65) Prior Publication Data

US 2003/0234737 A1    Dec. 25, 2003

(51) Int. Cl.
*G08C 19/00*    (2006.01)

(52) U.S. Cl. ............................. 340/825.72; 340/10.32; 340/825.69

(58) Field of Classification Search ................ 346/176; 340/825.72, 10.32, 825.69
See application file for complete search history.

(56) References Cited

U.S. PATENT DOCUMENTS

| | | | | |
|---|---|---|---|---|
| 4,825,200 A * | 4/1989 | Evans et al. | ................... | 341/23 |
| 5,412,377 A * | 5/1995 | Evans et al. | ........... | 340/825.22 |
| 6,008,735 A * | 12/1999 | Chiloyan et al. | ...... | 340/825.22 |
| 6,130,726 A * | 10/2000 | Darbee et al. | .............. | 348/734 |
| 6,256,019 B1 * | 7/2001 | Allport | ........................ | 345/169 |
| 6,384,737 B1 * | 5/2002 | Hsu et al. | ............... | 340/825.22 |
| 6,437,836 B1 * | 8/2002 | Huang et al. | ................ | 348/734 |
| 6,496,135 B1 * | 12/2002 | Darbee | ......................... | 341/173 |
| 6,563,430 B1 * | 5/2003 | Kemink et al. | ......... | 340/825.49 |
| 6,618,754 B1 * | 9/2003 | Gosling | ........................ | 709/220 |
| 6,640,144 B1 * | 10/2003 | Huang et al. | .................. | 700/65 |
| 6,721,954 B1 * | 4/2004 | Nickum | ........................ | 725/46 |
| 6,747,590 B1 * | 6/2004 | Weber | ......................... | 341/176 |
| 6,909,696 B1 * | 6/2005 | Zavgren, Jr. | ................. | 345/156 |

* cited by examiner

*Primary Examiner*—Jeffery Hofsass
*Assistant Examiner*—Kimberly Jenkins
(74) *Attorney, Agent, or Firm*—Harness, Dickey & Pierce, PLC

(57) ABSTRACT

The present invention is a personal programmable universal remote control apparatus comprising an input module receptive of command sets operable to control devices. The apparatus further comprises an interface module receptive of manual input from a user, and an organization module operable to organize the command sets into groups based on the manual input. The apparatus further comprises an output module operable to communicate commands to the devices based on the groups. According to one aspect, the groups are operable to define operating conditions for interrelated devices based on at least one of user preference and intelligence regarding device interactions. According to another aspect, the groups are operable to define a command sequence operable to perform an action requiring one or more devices that involves use of multiple commands of the associated command sets.

28 Claims, 11 Drawing Sheets

PERSONAL PROGRAMMABLE UNIVERSAL REMOTE CONTROL

FIELD OF THE INVENTION

The present invention relates generally to programmable remote controls for use with electronic devices. More particularly, the invention relates to command set organization and communication.

BACKGROUND OF THE INVENTION

Remote control systems for electronic devices have presented several problems for many years. Like early remote control systems, most remote control systems in use today rely on manufacture of a specific remote control apparatus for a specific device. As a result, where a user acquires several remotely controllable devices, the number of remote controls the user must possess, store, organize, and manipulate rises in a linear relationship to the number of remotely controllable devices owned by the user. The difficulty associated with finding the proper remote control for a device and learning how to manipulate different remote controls is only compounded by the eventual loss or breakage of one or more remote controls. Hence, others have attempted to address these problems by providing remote controls that operate a plurality of devices.

Attempts at developing a universal remote control have traditionally been frustrated by the need to store multiple sets of control codes within the remote control apparatus, and the need to provide a user interface that will operate a number of devices with vastly different functions. The universal remote controls developed have generally presented a large number of buttons that are confusing to the user, and these remotes usually have a library of shared sets of remote control codes for existing devices that the user must manually scan through and attempt to use with each remotely controllable device. A further need is one of adapting a remote to control a device not in existence at the time of manufacture of the universal remote and whose control codes and functions have not been anticipated. Mere universal remote controls fail to address this need because they are not programmable; as a result, programmable universal remotes have appeared in various forms.

Most commercially available programmable universal remote controls use a learning function so as to emulate another remote control. Usually, such remotes learn new functions in a key by key manner as the user selects a new key to program and then transmits that code to the programmable device from the device-specific remote control. Many users find this method tedious and time consuming, and users must usually remember the functions of keys for different devices. This method is also not available if the original remote control has been lost or damaged. Some variations have presented, however, that attempt to solve these problems.

Some remotes are capable of learning remote control codes by downloading them by modem or from a computer. These remotes generally follow the key by key approach using computer assisted software. Other remotes are specifically designed to control a computer base station that in turn controls various devices connected to the computer through professional installation. Adding new devices to this type of remote system is complex, time consuming, and usually costly. Another type of remote is automatically configurable to a device when the remote and the device have both been manufactured to enter into a two-way communication and follow a predetermined programming sequence. Such a remote, however, is generally not programmable for devices with which it was not manufactured to communicate.

Another type of remote controller capable of downloading command sets from a device is taught in "Remote controller, remote control interface, and remote control system including a remote controller and a remote control interface," by Kitao, et al., U.S. Pat. No. 6,124,804 issued to the Assignee of the present invention and herein incorporated by reference. A similar remote controller is taught in "Remote controller, remote control interface, and remote control system including a remote controller and a remote control interface," by Kitao, et al., U.S. Pat. No. 6,160,491 issued to the Assignee of the present invention and herein incorporated by reference.

At least one remote control possesses internet browsing capability and may therefrom separately receive control codes for a device, electronic programming guide information, and information for relating one to the other in order to allow the remote to internally relate one to the other and permit the user to select programming for a particular device using title-based direct access control.

The aforementioned remote controls fail, however, to permit a user to organize command sets into groups in a way that facilitates control of a system. For example, these devices do not permit a user to manually configure command sets of various interrelated devices to automatically create and/or recreate operating conditions for the interrelated devices based on user preference and/or intelligence regarding device interactions. Further, these devices do not permit a user to execute multiple commands in a command sequence operable to perform an action requiring one or more devices that involves use of multiple commands of the associated command sets. Still further, these devices are not adapted to controlling multiple devices at diverse locations encountered frequently by an individual person. Thus, a need remains for a personal programmable remote control that allows users to download, organize, and use command sets in the aforementioned manner. The present invention fulfills this need.

SUMMARY OF THE INVENTION

In one embodiment, the present invention is a personal programmable universal remote control apparatus comprising an input module receptive of command sets operable to control devices. The apparatus further comprises an interface module receptive of manual input from a user, and an organization module operable to organize the command sets into groups based on the manual input. The apparatus further comprises an output module operable to communicate commands to the devices based on the groups. According to one aspect, the groups are operable to define operating conditions for interrelated devices based on at least one of user preference and intelligence regarding device interactions. According to another aspect, the groups are operable to define a command sequence operable to perform an action requiring one or more devices that involves use of multiple commands of the associated command sets.

In a further embodiment, the present invention is a method of operation for use with a personal programmable universal remote control. The method comprises receiving command sets operable to control devices, receiving manual input from a user, organizing the command sets into groups based on the manual input, and communicating commands to the devices based on the groups. According to one aspect of the present invention, the groups are operable to define operating conditions for interrelated devices based on at least one of user preference and intelligence regarding device interactions. According to another aspect of the present invention, the groups are operable to define a command sequence operable to perform an action requiring one or more devices that involves use of multiple commands of the associated command sets.

DETAILED DESCRIPTION OF THE PREFERRED EMBODIMENTS

Figure 1:
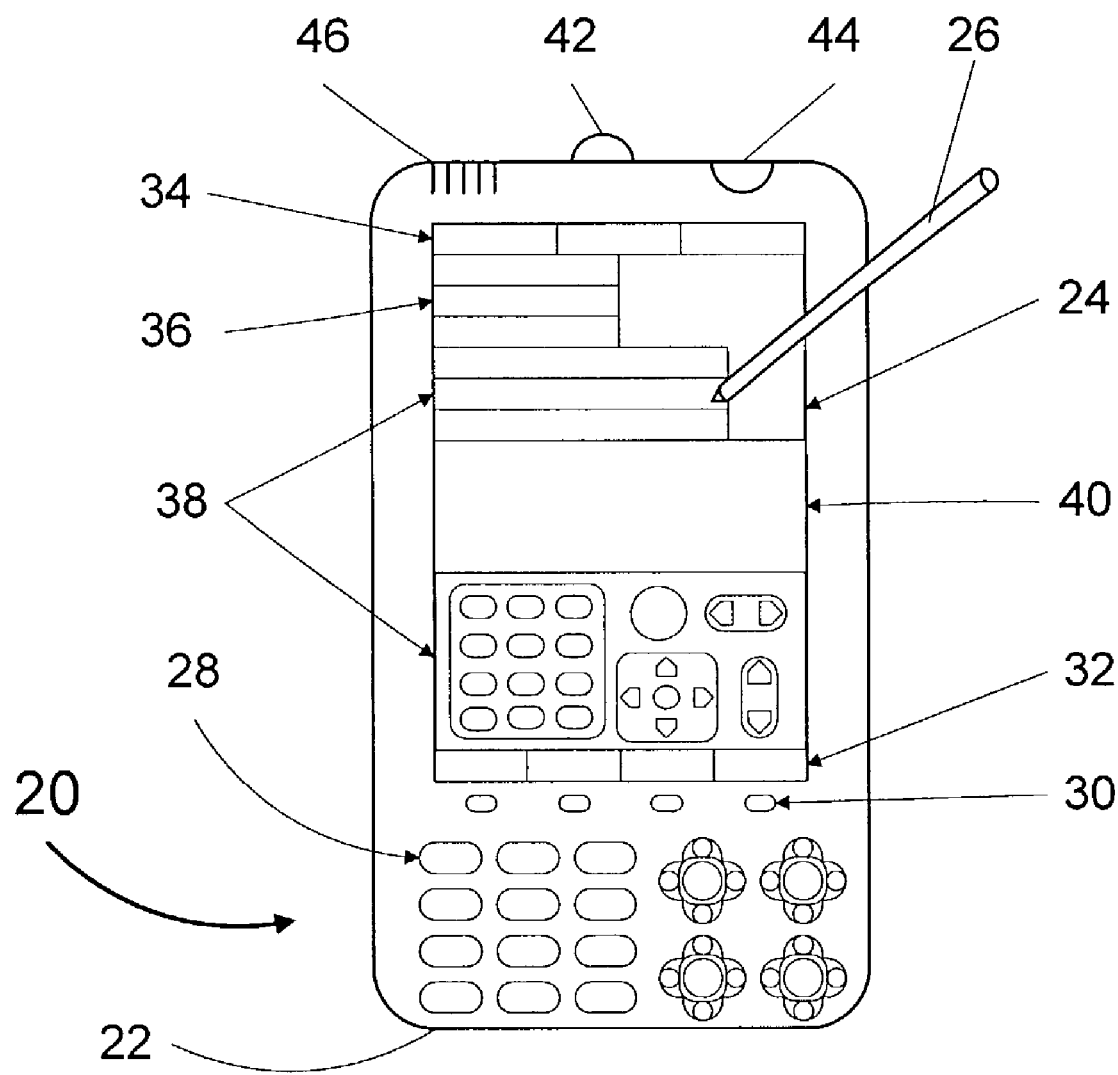
FIG. 1 is a diagram of an embodiment of the personal programmable universal remote control apparatus depicting some of the features of the device.

Referring to FIG. 1, a personal programmable universal remote control 20 is shown. The preferred embodiment of the personal programmable universal remote control 20 is adopted from a personal digital assistant and modified for the purpose of serving as a personal programmable universal remote control 20. As may be readily appreciated from FIG. 1, the personal programmable universal remote control 20 features a thin, rectangular housing 22 that fits easily within a user's hand or shirt pocket. The preferred active display 24 is operable with a convenient stylus 26 and the preferred function keys 28 facilitate user access to common functions such as the number pad, channel, and volume controls of a television remote control. In addition, the personal programmable universal remote control 20 features a plurality of programmable function keys 30 for operating programmable functions 32 that the user may choose to set based on preference. Optionally, one or more of preferred function keys 28 may also be programmable at an option of the user, and have directional toggle and/or selection-based functionality to maximize user personalization options. Further, programmable functions 32 may facilitate user control of devices with uncommon functions that the user seeks to remotely control on a regular basis, and may also have other uses defined by the user, including communication of one or more user-defined command sequences.

The active display 24 pictured in FIG. 1 displays a number of advantages of the personal programmable universal remote control 20 of the present invention. The categories 34 at the top of the active display 24 appear in a menu format, but the user may also select categories as icons according to user preference. In one embodiment, examples of categories 34 that may appear on the active display 24 are location-based. Hence, "HOME," "OFFICE," and "OTHER" might appear for user selection. Sub-categories 36 may appear on the active display 24 in menu format or as icons and, in the location-based embodiment, may appear as names of locations corresponding to the selected location. For example, if the category 34 "HOME" is selected by the user, then the sub-categories 36 "LIVING ROOM," "DINING ROOM," "KITCHEN," "FOYER," "YARD," "MASTER BED ROOM," "GUEST ROOM," etc. might appear. If the user owns more than one home, the sub-categories 36 of "HOME," "SUMMER-HOME," and "FLAT IN LONDON" might appear and then the locations listed above such as "LIVING ROOM" and "BEDROOM" would likely be further sub-categories of one of the selected sub-categories 36. Eventually, the user would access a set of sub-categories 36 corresponding to controllable devices at a particular location.

Once a device is selected for control, available options 38 may appear on the active display 24 corresponding to functions the device may perform. In the case of a remotely controllable "Entertainment System," the available options 38 for controlling the television might be "POWER ON/OFF," "CHANNEL UP," "CHANNEL DOWN," "VOLUME UP," "VOLUME DOWN," "FORMAT UP," "FORMAT DOWN," "INPUT UP," INPUT DOWN," and also number keypad functions. Alternatively or additionally, showing titles and times corresponding to electronic programming guide information may be displayed as available options 38. In the case of electronic programming guide information, the information concerning an option 40 displayed on the active display 24 for a tentatively selected available option 38 might be movie content, actors, rating, duration, etc. In the case where device functions correspond to tentatively selected available options 38, the information concerning an option 40 might be helpful information concerning operation of the device corresponding to that function. As shown, the available options 38 for the remotely controllable device should be displayable as text in a menu format or as buttons in an icon format to reflect the user's preference.

Once the user has selected an available option 38, the personal programmable universal remote control 20 of FIG. 1 outputs an infra-red signal from its infra-red transmitter 42 for remote control of the device based on the control code for that device. The personal programmable universal remote control 20 also features an infra-red receiver 44 for signal input. Other embodiments of the invention may possess means other than or in addition to the infra-red transmitter 42 for signal output and possibly relay to controllable devices that are known to those skilled in the art. Similarly, other embodiments of the invention may possess means other than or in addition to the infra-red receiver 44 for signal input that are known to those skilled in the art. Some examples of these means include radio and ultrasonic signal transmission. The preferred embodiment of FIG. 1 also features a microphone 46 for selecting available options 38 with the added foreseeable ability to relay voice commands to the remotely controllable device in signal format. Additionally, the microphone 46 may permit the user to accomplish on-board, speech-recognition-based operation that would not normally be possible with the device. An additional software upgrade to the personal programmable universal remote control 20 may be required to facilitate the speech-recognition-based operation function.

Figure 2:
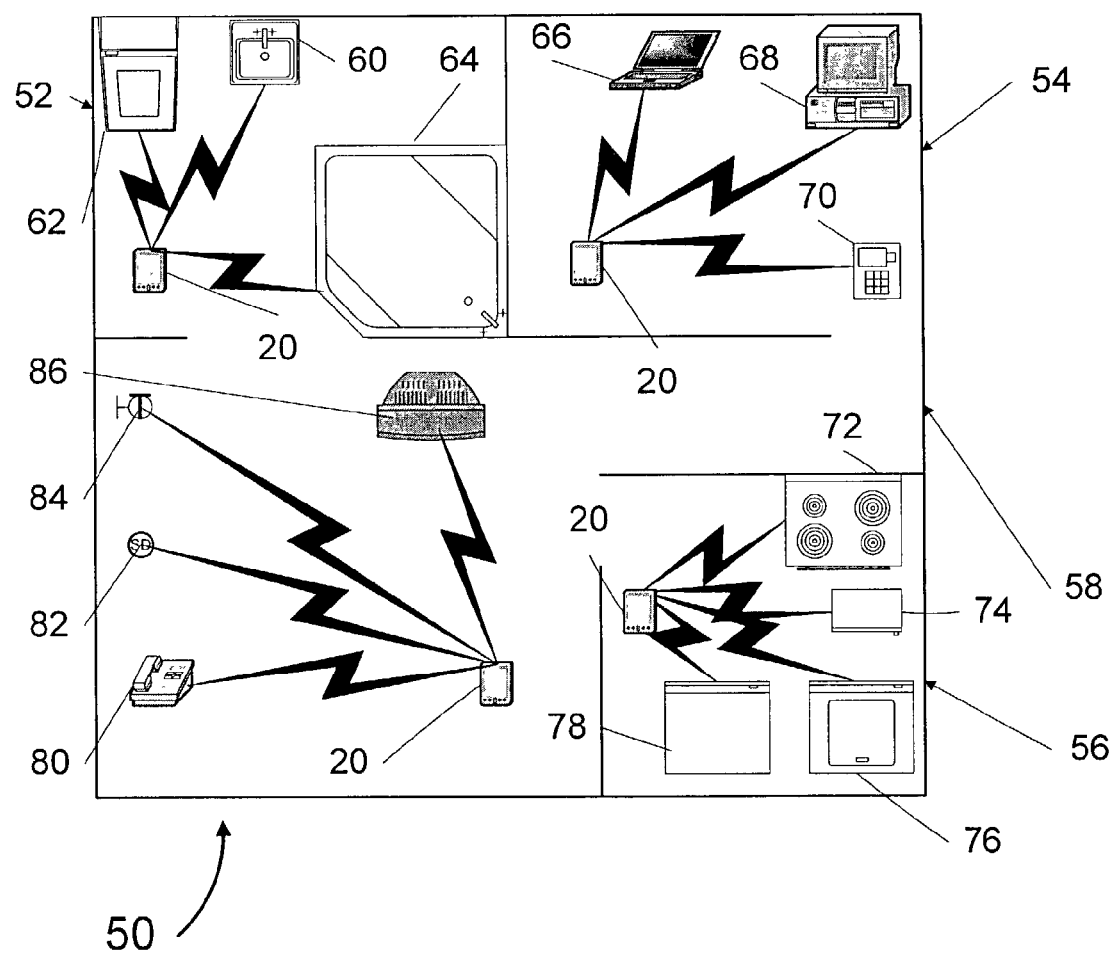
FIG. 2 is a floor plan of a home depicting the personal programmable universal remote in communication with various devices.

Referring now to FIG. 2, a floor plan of a home 50 depicting the personal programmable universal remote control 20 in communication with various remotely controllable devices is shown. As shown, the personal programmable universal remote control 20 may communicate with devices in a bathroom 52, devices in an office 54, devices in a kitchen 56, and devices in a common area 58. As may be appreciated, the personal programmable universal remote control 20 may be used in other areas of a location as well as other locations in which it is physically present and, if means other than or in addition to infra-red transmission is utilized for control of controllable devices as previously mentioned, the personal programmable universal remote control 20 may accomplish remote control of such devices in areas and locations in which it is not present. As shown, the personal programmable universal remote control 20 may communicate with a diverse array of remotely controllable devices such as sinks 60, toilettes 62, showers and tubs 64, laptop computers 66, desktop computers 68, home security systems 70, ranges 72, microwave ovens 74, washing machines 76, dryers 78, telephones and answering machines 80, fire safety systems 82, environmental control systems 84, and "Entertainment System"s 86. Myriad other possible types of controllable devices with which a personal programmable universal remote control 20 may communicate exist and include, for example, lawn care equipment, model airplanes, and automobile security and starting systems.

Figure 3:
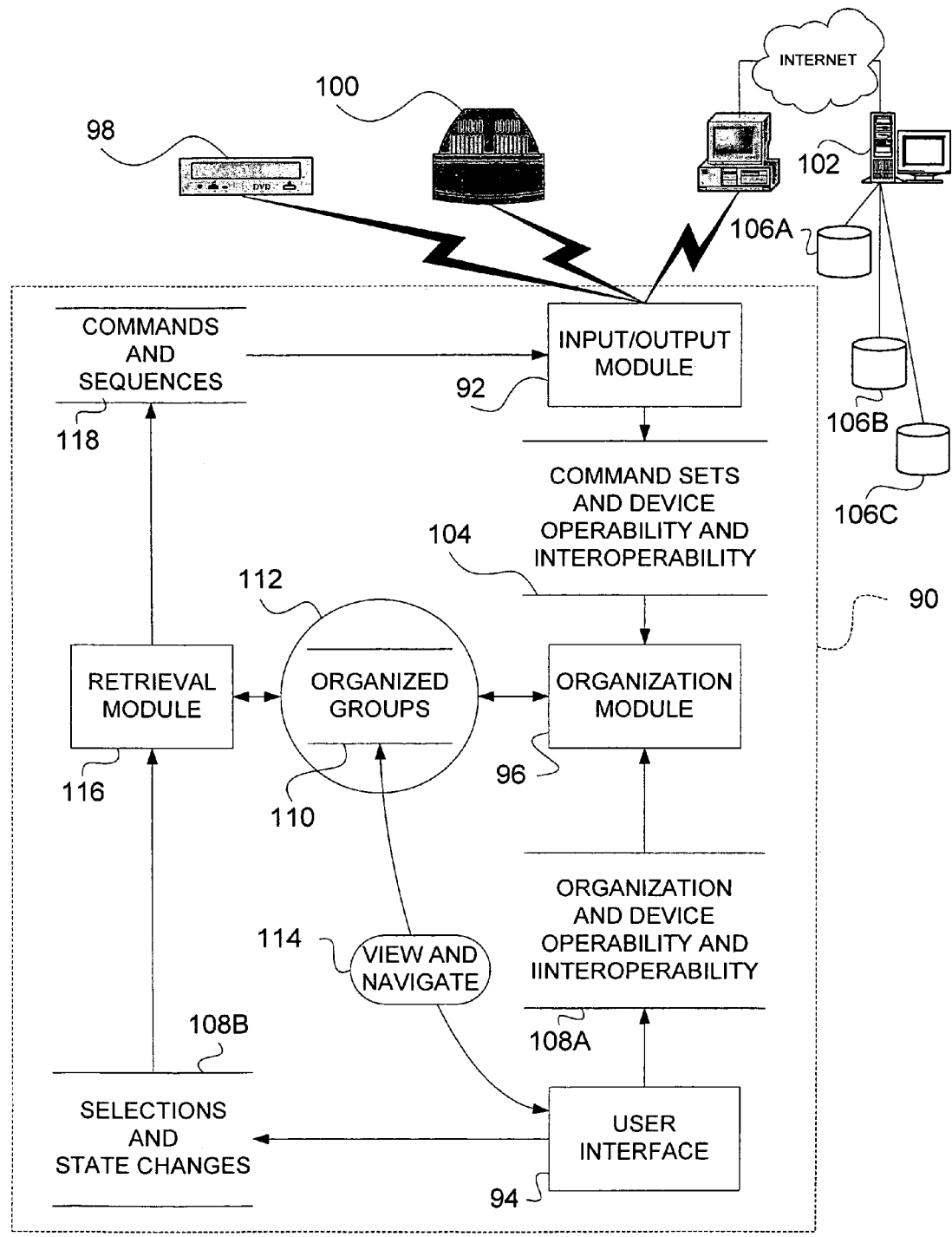
FIG. 3 is a block diagram depicting the software system of the apparatus of present invention under operation according to the method of the present invention.

Referring to FIG. 3, the personal programmable universal remote control apparatus possesses the necessary software to accomplish the method of the present invention. This software includes appropriate input, user interface, organization, and output modules. For example, software system 90 includes an input/output module 92, a user interface module 94, and an organization module 96. Input/output module 92 is receptive of command sets operable to control various devices, and may receive them from the devices themselves. Such devices include DVD player 98 and television 100. Input/output module 92 may alternatively or in addition receive command sets from other sources having the command sets stored in memory, such as web server 102. Upon receipt, input/output module 92 communicates received command sets 104 to organization module 96. Optionally, information regarding device operability and/or interoperability may be acquired in the same way as command sets, and a proprietary web server 102 for servicing the invention may have a command set database 106A, a device operation database 106B, and/or a device interoperability database 106C for providing these types of information. It is also likely that the remote will come equipped with at least some of these types of information stored in on-board memory. Similarly, user interface module is receptive of manual input from a user, and is operable to communicate manual input 108A comprising organization information and optionally including device operability and/or interoperability information to organization module 96. In turn, organization module 96 is operable to organize received command sets 104 based on received manual input 108A, thereby constructing organized groups 110. Resulting organized groups 110 are preferably stored in onboard computer memory 112, where a user can view and navigate the organized groups as at 114 via functionality of an on-board operating system (not shown).

User interface 94 is further operable to communicate manual input 108B comprising selections and state changes to retrieval module 116. Retrieval module 116, in turn, is operable to retrieve commands and command sequences 118 from organized groups 110 based on selections and state changes, respectively. Retrieval module 116 is further operable to communicate commands and command sequences 118 to input/output module 92, wherefrom they are communicated to remotely controllable devices.

Figure 4:
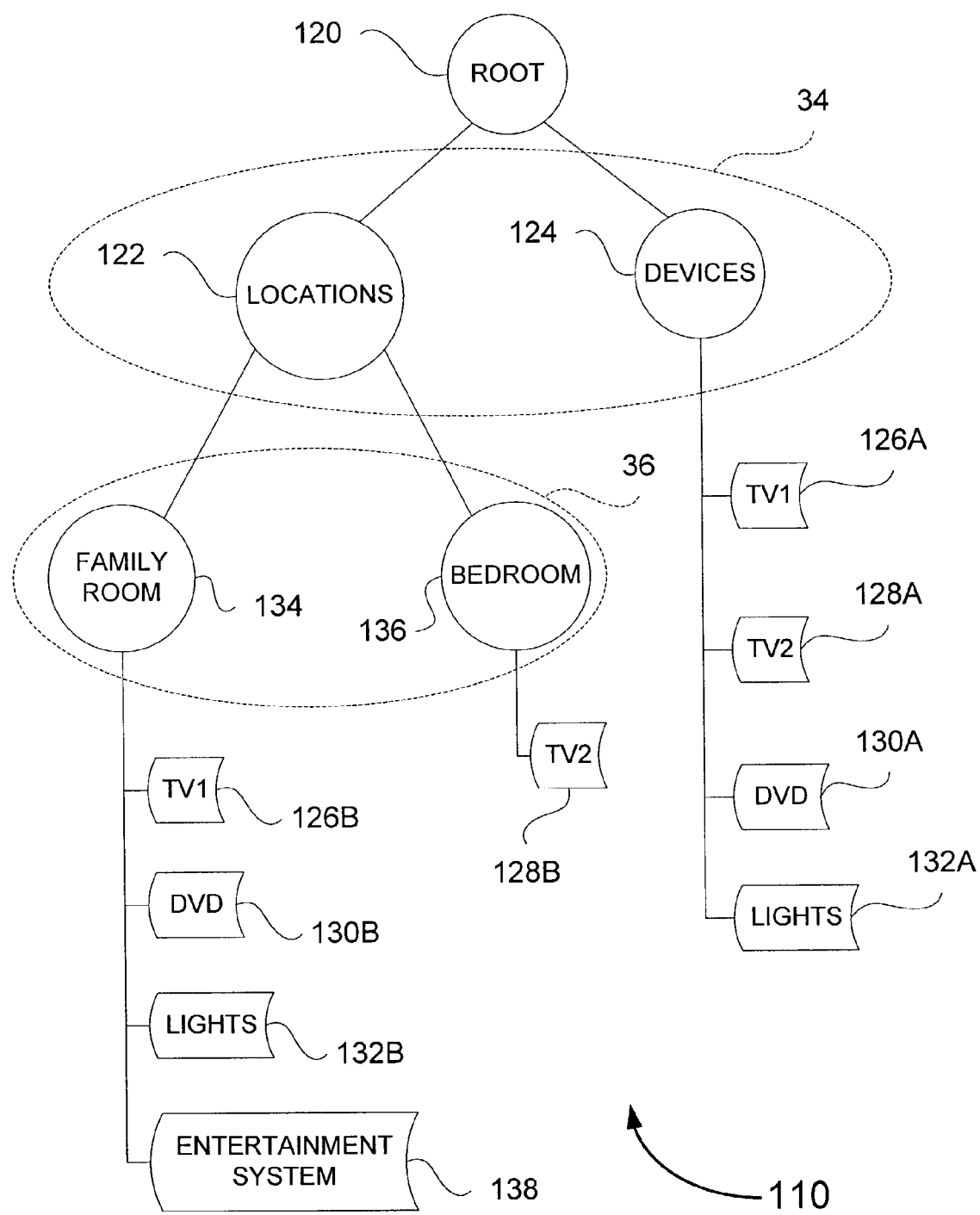
FIG. 4 is a block diagram depicting organized groups according to the present invention.

Referring to FIG. 4, an example of an organized group 110 has tree-like data structure characteristics wherein branches from root node 120, reflect basic organizational preferences defined by a user via manual input. Root node 120, therefore, defines a user-defined hierarchy wherein child nodes 122 and 124 lead to categories in a manner defined by a user. For example, child node 124 has been defined by a user as a repository for command sets for various devices regardless of location. Thus, the user logically chooses to store a first television command set 126A, a second television command set 128A, a DVD command set 130A, and an overhead lights command set 132A. Further, a category may be predefined in the personal programmable universal remote to contain command sets for various devices and have several command sets pre-stored in memory to facilitate user access to command sets. Still further, the user could alternatively or additionally chose to define a guides category for storing various source guides and/or program guides. Child node 122, however, has been defined by a user as a root note for a location-based hierarchy of command sets. Thus, child nodes 134 and 136 lead to sub-categories chosen by the user to serve as repositories for command sets based on locations of associated devices. For example, child node 134 may be named "Family Room" by a user, whereas child node 136 may be named "Bedroom."

Child node 136 is logically chosen by the user to store second television command set 128B, because the associated television is physically located in the user's bedroom. Similarly, child node 134 is logically chosen by the user to store first television command set 126B, DVD command set 130B, and an overhead lights command set 132B. Contents of a command set may also correspond to a macro integrated with the command sets to provide a command sequence and/or command correspondences. Such a macro may allow a user to perform several commands with one action. Further, a source guide and/or program guide may be stored in child node 134 or included in a command set for reference by a user.

According to the system and method of the present invention, the user is able to instantiate a user-defined device 138 and store therein selected commands from command sets of multiple devices. Thus, the user may define an "Entertainment System" device and add selected commands, command sequences, source guides, and/or program guides from first television command set 126B, DVD command set 130B, and/or overhead lights command set 132B. Further, the user may choose to add selected commands, command sequences, source guides, and/or program guides from first television command set 126A, second television command set 128A, DVD command set 130A, overhead lights command set 132A for devices at an unspecified location, and/or second television command set 128B. Still further, the user can define additional command sequences and store source guides and program guides in association with the "Entertainment System."

Figure 5:
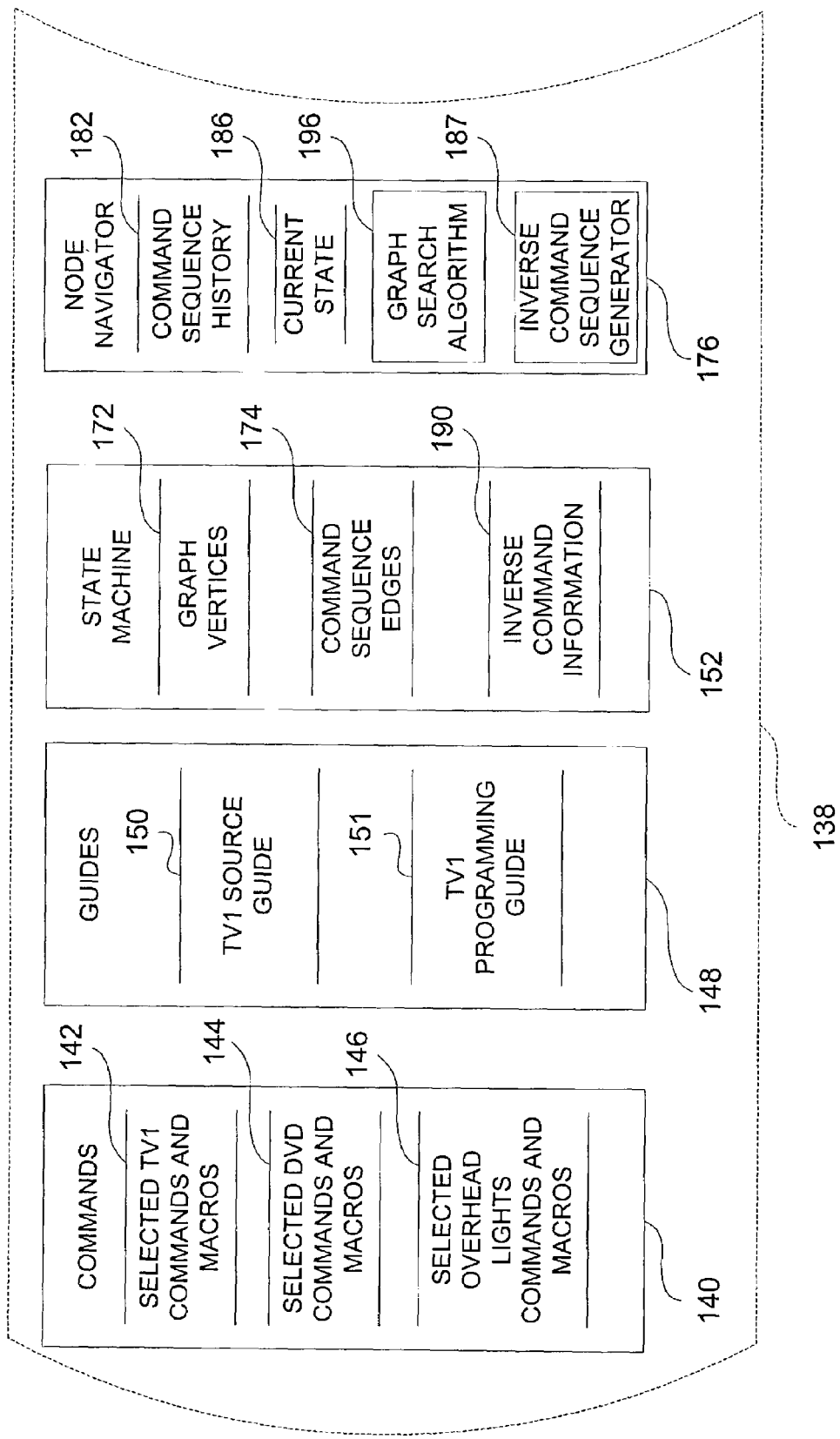
FIG. 5 is a block diagram of a user-defined device according to the present invention.

Referring to FIG. 5, user-defined device 138 is explored in greater detail. In accordance with the definition of an "Entertainment System" as in the previous example, user-define device 138 comprises selected commands 140 that include selected TV1 commands and macros 142, selected DVD commands and macros 144, and selected overhead lights commands and macros 146. Further, user-defined device 138 comprises selected guides that include TV1 source guide 150 that provides channel-station correspondence for the location, and TV1 programming guide 151 that provides program-station correspondence as well as program information for the location. User-defined device 138 further includes command sequences, possibly user-defined, in the form of state machine 152.

Thus, where an "Entertainment System" comprises a DVD player connected to a television at "Input 1," a user-provided command sequence may automatically change the television input to "Input 1" when a user selects to play a DVD from within the "Entertainment System." This functionality may be implemented by allowing a user to manipulate the devices into a state suitable for interoperability and then save the resulting state as a user-defined configuration.

To these and other ends, the personal programmable universal remote control may have state machines stored in memory for various devices that allow the invention to track a state of a device. Where a device and the personal programmable universal remote mutually communicate, functionality may be implemented that causes the device to confirm that it has changed state as commanded and/or communicate its current state to a user. New state machines for a user-defined group may further be generated based on existing state machines, and may additionally be based on manual input from a user, such as inputting existence of the connection of the DVD and the television at "Input 1." As further examples, a user may define a command sequence entitled "Play DVD" that comprises switching the input to "Input 1," switching the display format of the television to 4:3 aspect ratio to accommodate display of a movie in letterbox format, and further comprises opening the DVD player to accept a DVD and dimming the overhead lights. Complimentarily, the user may define a command sequence entitled "Watch Television" that comprises switching the input to "Input 2," switching the display format of the television to 16:9 aspect ratio to accommodate display of television in HDTV format, and further comprises stopping play of a movie, and ejecting the movie. A user may desire, however, to have a different sequence of commands under different circumstances.

Progression from one state of the "Entertainment System" may invoke a different command sequence than progression from another. For example, if a DVD is not being played, if the television is turned off and was last set to "Input 1" and 16:9 aspect ratio, and if the lights are on a bright setting, then a preferred command sequence for "Watch Television" would likely consist of turning on the television and dimming the lights. One way to handle the need for different command sequences based on circumstances is for the user to define multiple command sequences for different situations, and select a command sequence based on circumstances known to the user. It may be desirable to have command sequences be state dependent. Thus, even where a state inquiry functionality is not provided, a user can create a state machine for the "Entertainment System" by inputting a sequence of commands to configure the "Entertainment System" into a desired state, and saving the command sequence as the change from one state of the "Entertainment System" to another. Thus, a user may merely define and select a desired state of the system and cause the remote control to output the appropriate command sequence based on a current state of the system. Further, a user may choose to implement an entry of an initial state and a final state to define and select command sequences, thus eliminating the need of the remote control to track a current state of the "Entertainment System."

Figure 6:
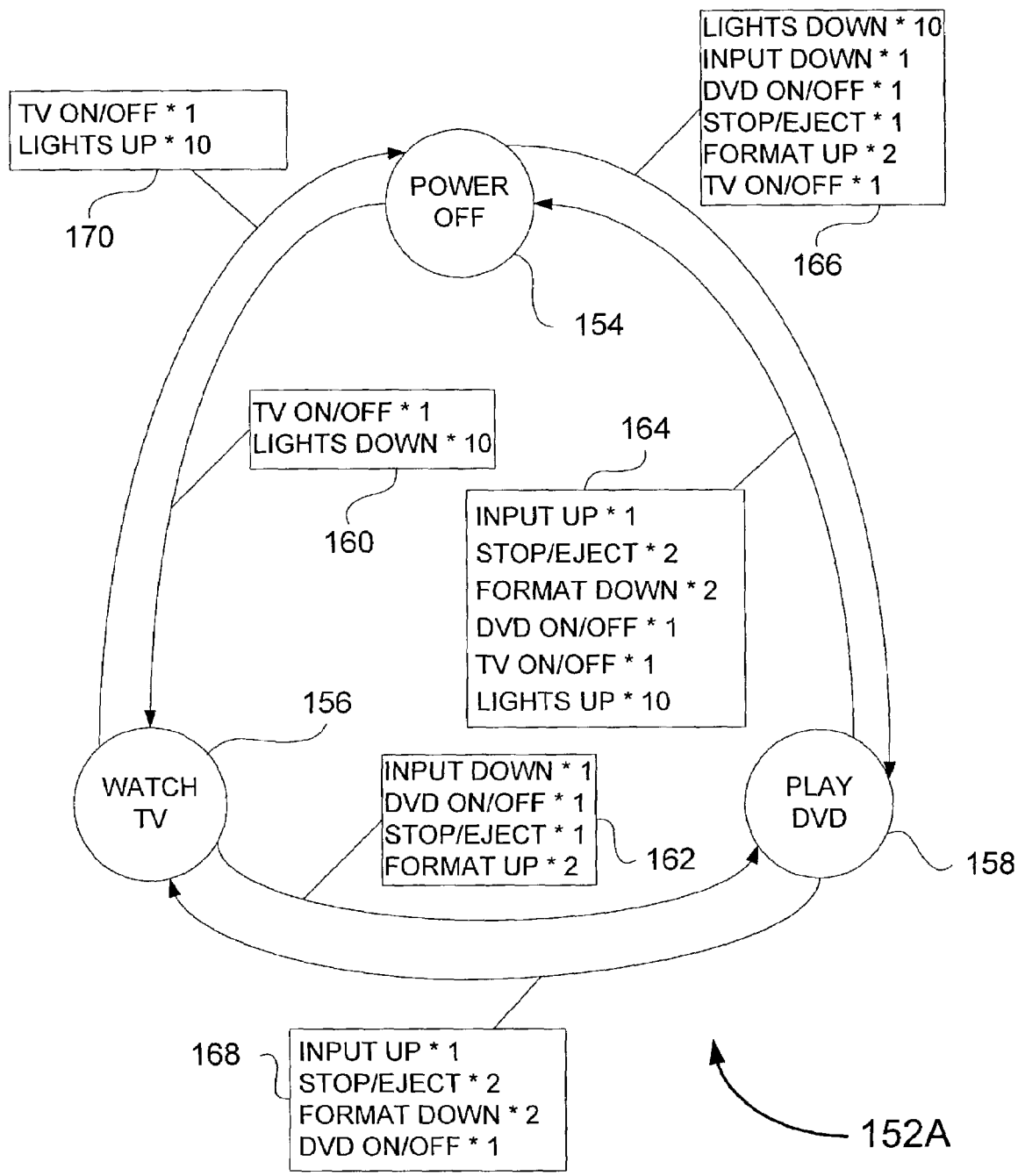
FIG. 6 is a block diagram of a user-defined state machine for a user-defined device according to the present invention.

Referring to FIG. 6, a user-defined state machine 152A according to the present invention has a "Power Off" state 154, a "Watch TV" state 156, and a "Play DVD" state 158. In the course of defining the state machine 152A, the user manipulates the "Entertainment System" into a "Power Off" state and instantiates the three states, giving them appropriate names. The user selects to program a new command sequence, selects state 154 as an initial state, manipulates the "Entertainment System" into a desired state by entering command sequence 160, and selects state 156 as the final state. The user further selects to program a new command sequence, selects state 156 as an initial state, manipulates the "Entertainment System" into a desired state by entering command sequence 162, and selects state 158 as the final state. The user further selects to program a new command sequence, selects state 158 as an initial state, manipulates the "Entertainment System" into a desired state by entering command sequence 164, and selects state 154 as the final state. The user further selects to program a new command sequence, selects state 154 as an initial state, manipulates the "Entertainment System" into a desired state by entering command sequence 166, and selects state 158 as the final state. The user further selects to program a new command sequence, selects state 158 as an initial state, manipulates the "Entertainment System" into a desired state by entering command sequence 168, and selects state 156 as the final state. The user further selects to program a new command sequence, selects state 156 as an initial state, manipulates the "Entertainment System" into a desired state by entering command sequence 170, and selects state 154 as the final state.

With state machine 152A, the graph vertices 172 (FIG. 5), or nodes, of the graph are interrelated in such a manner that each node is a state that has every other state as a neighbor. Further, the command sequence edges 174 for moving to any neighbor from any state are clearly defined by the user, such that it is possible for the user to move from one state to another with ease. It may be necessary in this process for a user to indicate initial and final states when selecting command sequences, but the invention may alternatively track the current state of the user-defined system so that the user only needs to enter a final state. With the implementation of state machine 152A (FIG. 6), however, a user must still enter increasing numbers of command sequences as new states are added. For example, adding a fourth node to state machine 152A with user-defined, bidirectional command sequence edges to all other graph vertices requires entering six more command sequences. Further addition of another node similarly doubles the number of command sequences that a user has to enter. Still further, the number of command sequences required to maintain this functionality continues to rise in an exponential fashion as more nodes are added. Thus, a node navigator 176 (FIG. 5) facilitates generation and use of state machine 152.

Figure 7:
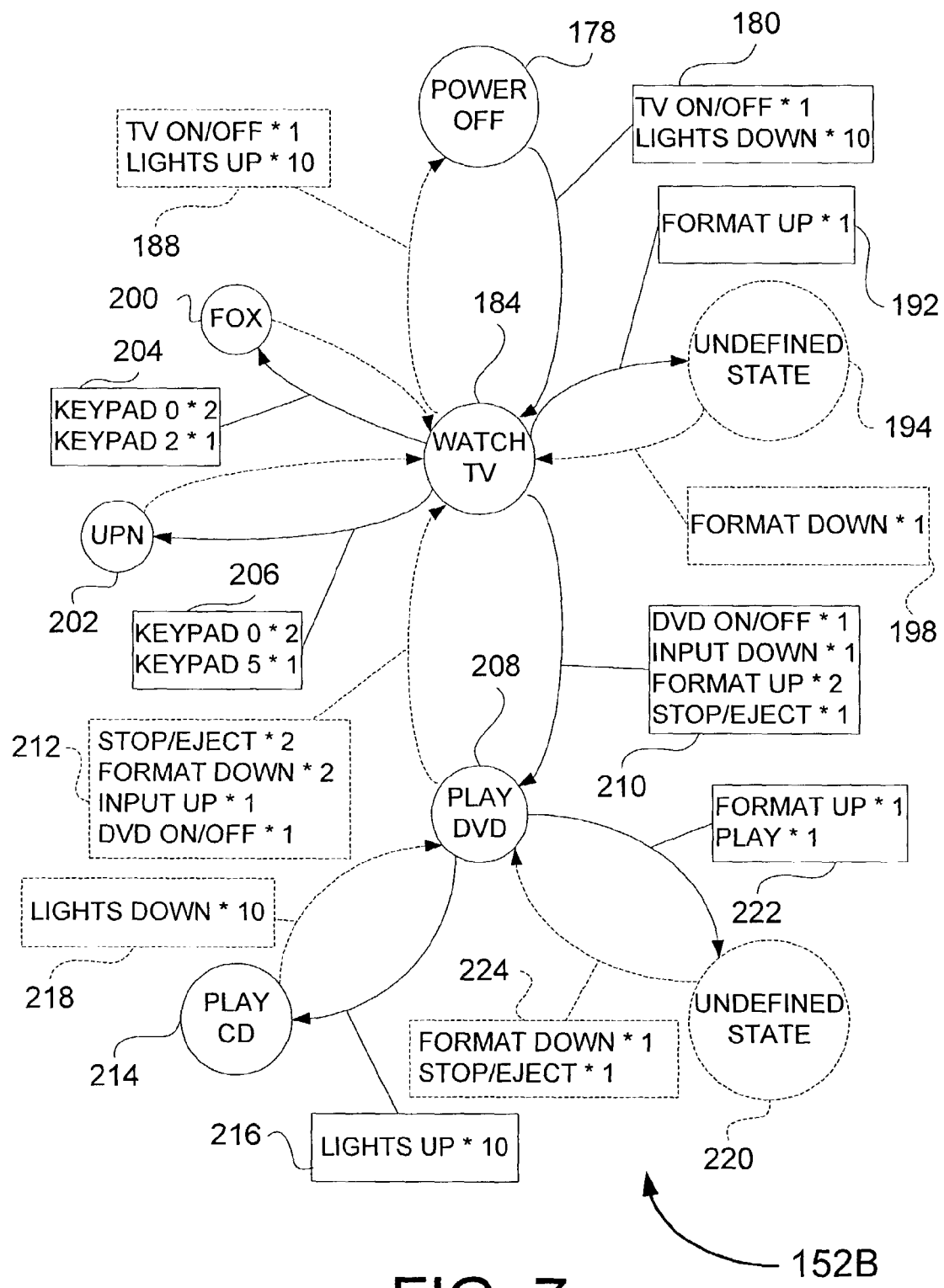
FIG. 7 is a block diagram of a user-defined state machine for a user-defined device according to the present invention.

Referring to FIG. 7, state machine 152B has an initial "Power Off" state 178 which may be provided as a root node or instantiated by the user. Thence, the user enters command sequence 180, which the node navigator 176 (FIG. 5) stores in the form of a command sequence history 182. Thence, the user chooses to add a new command sequence and names the automatically instantiated new state 184 (FIG. 7) "Watch TV." State machine 152 (FIG. 5) further automatically creates a command sequence edge describing nodes 178 and 184 as neighbors based on command sequence history 182. Command sequence history 182 may then be set to "null," and state 184 (FIG. 7) saved as the current state 186. Node navigator 176 (FIG. 5) further has an inverse command sequence generator 187 operable to generate an inverse command sequence 188 (FIG. 7) for returning to state 178 from state 184 based on command sequence 180 and inverse command information 190 (FIG. 5). Inverse command information 190 may be initially stored onboard as device operability information, downloaded from a source of the information, inherent in and determinable from a command set and/or macro, and/or determined from similar names, same device, and keywords implying an inverse relationship such as "Up," "Down," "Left," and "Right." The inverse command information may also be provided by a user in a variety of ways.

The ways a user can provide inverse command information 190 are many and too numerous to fully relate, but some ways a user can provide the information deserve direct discussion. One way a user can provide the information is to configure a button command that has up/down and/or left/right state change functionality. Thus, a user may define a directly inverse relationship between two commands. Further, if a user does define a return command sequence between two states, an inverse relationship, direct or otherwise, may be determined by comparison of the command sequences. For example, a "Power On/Off" command is a cyclic two-state command. Thus, comparing two inverse (i.e. entering and exiting neighboring vertices) edges each containing one instance of the "Power On/Off" command logically reveals that the command serves as its own inverse. Further, a "Format" command that cycles through five display modes involving a couple of aspect ratios is a cyclic five-state command, such that a sequence of four "Format" commands is the inverse of a sequence of one "Format" command. Thus, it would be logical for inverse command sequence generator 187 to determine that a sequence of two "Format" commands is the inverse of three "Format" commands simply by comparing inverse edges describing the four to one inverse relationship. A non-directed, cyclic command could also be compared, such that an inverse relationship between "Format Up" and "Format Down" commands could be determined based on the similar "Format" names, "Up" and "Down" keywords, and/or inverse use. Thus, inverse command sequence information 190 may be extracted based on comparison of command sequence edges 174. Finally, a user may directly create a table of inverse relationships between commands, preferably with a convenient drag and drop functionality.

From a defined state, a user may enter a command sequence that leads to an undefined state. For example, if the user leaves state 184 (FIG. 7) by entering command sequence 192, an undefined state 194 is reached wherein, for example, the user has switched to a narrow screen 4:3 aspect ratio to watch a non-HDTV television broadcast. Command sequence 192 is saved as the command sequence history 182 (FIG. 5), because it is a command sequence exiting a known state. Thus, if the user communicates to retrieval module 116 (FIG. 3) a return to the "Power Off" state 178 (FIG. 7) from the undefined state 194, a graph search algorithm 196 (FIG. 5) determines a path of vertices through the graph of state machine 152B (FIG. 7), and inverse command sequence generator 187 (FIG. 5) determines an inverse command sequence based on the command sequence history 182 and applicable command sequence edges 174 to arrive at inverse command sequences 198 (FIG. 7) and 188, respectively. Thence, retrieval module 116 (FIG. 3) retrieves inverse command sequences 198 (FIG. 7) and 188 and communicates them to input/output module 92 (FIG. 3), wherefrom they are communicated to respective devices to affect the desired state change(s). Further, "Power Off" state 178 (FIG. 7) is saved as the current state 186, and command sequence history 182 (FIG. 5) is reset to "null."

The user can also define further states. For example, from state 184 (FIG. 7), a user may create states 200 and 202, based on command sequences 204 and 206, respectively. These command sequences 204 and 206 are composed of television keypad entries for switching to a desired channel, and the user may choose to name the states after corresponding stations for the location, such as "FOX" and "UPN." Thus, the user may provide a station guide based on personal knowledge that is integrated into the state machine of the system. In the course of switching between states 200 and 202, inverse command sequence generator 187 (FIG. 5) determines from inverse command information 190 that keypad entries have a "null" inverse. Thus, when graph search algorithm 196 determines a path from state 200 to state 202 through state 184, a "null" inverse command sequence is returned for reaching state 184, and command sequence 206 is returned for reaching state 202.

As a further example, state 208 for playing a DVD may be created from state 184 by entering command sequence 210 and saving and naming the state. An inverse command sequence 212 is further determinable as needed. Notably, state 208 could similarly be added from state 178, but in the course of entering the command sequence 166 (FIG. 6), the state 184 (FIG. 7) would be reached, so that the command sequence history 182 (FIG. 5) would be reset and contain the command sequence 210 (FIG. 7) upon reaching state 208. Thus, the same edge describing the same neighbors would potentially be created. Of further note, if the commands had been entered in a different order, state 184 would not necessarily be reached and the command sequence history would not be reset. Thus, optional functionality may be employed that adds a new state to a closest defined state by comparing the command sequence history to edges of state machine 152B, and navigating the state machine while modifying the command sequence history based on the comparison. Similar functionality may be employed for other purposes.

Similar functionality may be employed, for example, when changing from one defined state to another, such that an equation in Boolean algebra can be generated based on all applicable inverse command sequences and command sequences, reduced to a simplest order form solution, and converted to a new command sequence based on the solution for achieving the state change. Thus, if returned command sequences and inverse command sequences include turning a device off and then back on, these inverse commands can be eliminated. Where the previously mentioned optional functionality that adds a new state to a closest defined state is employed, however, the resulting state machine generally closely approximates a simplest order form solution for any graph search. Nevertheless, it may be desirable to use the two functionalities together.

Further to demonstrating the present invention with regard to state machine 152B, a user may desire to have the overhead lights on bright when playing a CD rather than a DVD in the DVD player. Thus, a "Play CD" state 214 may be defined with command sequence 216 and inverse command sequence 218 providing the appropriate route for transitioning between states 208 and 214. Hence, if the user changes the TV format to narrow screen 4:3 aspect ratio in the course of playing a DVD to arrive at undefined state 220, then command sequence history 222 serves as a basis for generating inverse command sequence 224. Thence, the user can reach any defined state in state machine 152B from any other defined state or any undefined state, simply by selecting the final state. As a result, organization module 96 (FIG. 3) is capable of organizing commands from selected command sets in sequences for operating the associated devices based on manual input from a user regarding device operability and interoperability, and further embodiments exist for accomplishing this capability.

Figure 8:
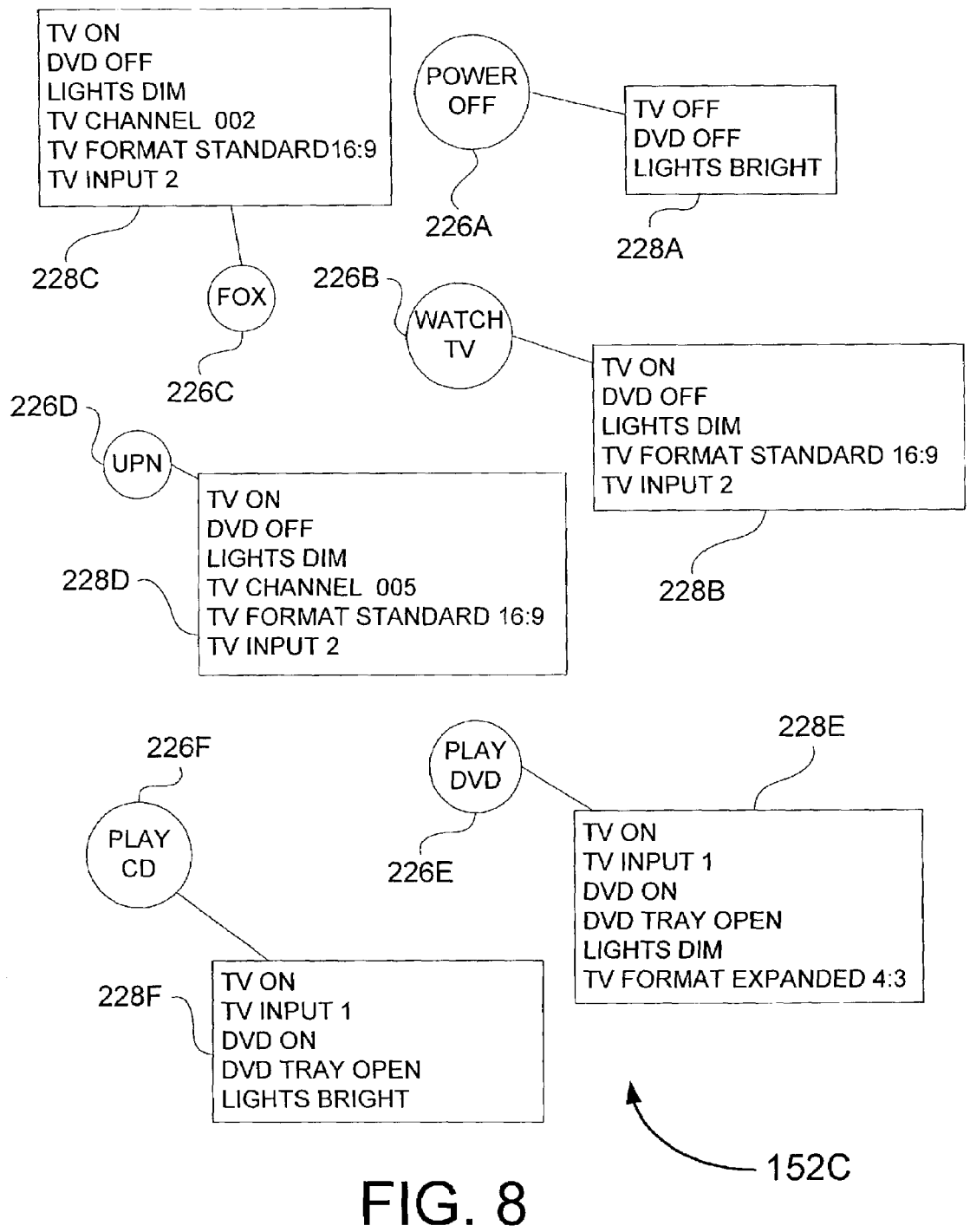
FIG. 8 is a block diagram of a user-defined state machine for a user-defined device according to the present invention.

Referring to FIG. 8, another embodiment for organizing command sequences is invoked in a case where each device in the system is capable of moving to a pre-defined state or set of states based on a received command. In such a case, the devices have on-board state machines for moving to a final state based on a current state. Thus, a user-defined state machine 152C of the "Entertainment System" is generally composed of user-defined states 226A–226F with command sequences 228A–228F for attaining associated states of devices stored in association with the user-defined states 226A–226F. In other words, each user-defined state has an incoming edge that is a command vector for moving to that state from any state, whether defined or undefined. Thus, a user may manipulate devices of the system into a user-defined state and query device elements of the "Entertainment System" for their current state(s). Alternatively, the commands for attaining the state(s) may be manually entered. It is also likely that it may be desirable to combine the functionalities of state machine 152B (FIG. 7) and state machine 152C (FIG. 8) to accommodate integration of both types of devices in a user-defined system.

Figure 9:
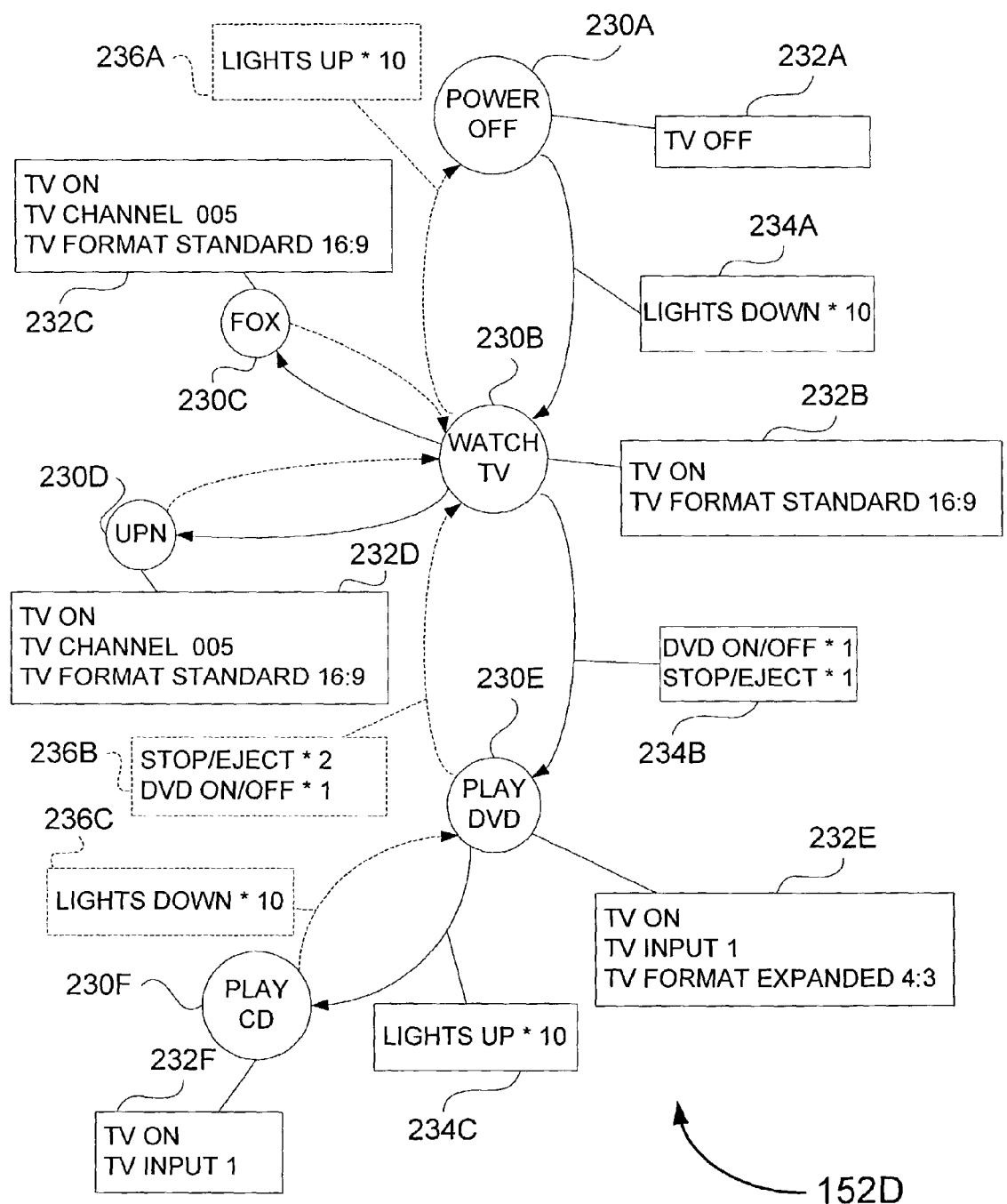
FIG. 9 is a block diagram of a user-defined state machine for a user-defined device according to the present invention.

Referring to FIG. 9, state machine 152D accommodates a television with an on-board state machine that is integrated with a DVD player and overhead lights that do not have on-board state machines. Thus, user-defined states 230A–230F have associated command vectors 232A–232F for controlling the television and edges defined by command sequences 234A–234C and inverse command sequences 236A–236C for controlling the DVD player and overhead lights. According to this implementation, the invention preferably keeps track of whether a device has an on-board state machine, queries those types of devices for their associated states to create the command vectors, and creates the command sequence history based only on commands of other types of devices. Other implementations, however, may also exist. For, example, state machine 152D could as easily be implemented with the command vectors integrated into the command sequences. In such a case, the commands for controlling the television are the same at all incoming edges leading to a particular user-defined state. In this case, the invention may keep track of device types and use queries and command sequence histories, or may simply use a command sequence history that includes all the device commands. Further, device type and associated commands can be used when determining inverse command sequences.

In terms of user operation, state machines 152B (FIG. 7), 152C (FIG. 8), and 152D (FIG. 9) are substantially similar. In each case, it is only necessary for a user to manipulate devices into appropriate states and save the configuration as a user-defined state. Thence, the user may move to a defined state from any other defined or any undefined state merely by selecting to move to the user-defined state. The three state machines merely enable various ways of accomplishing the present invention under different conditions.

Figure 10:
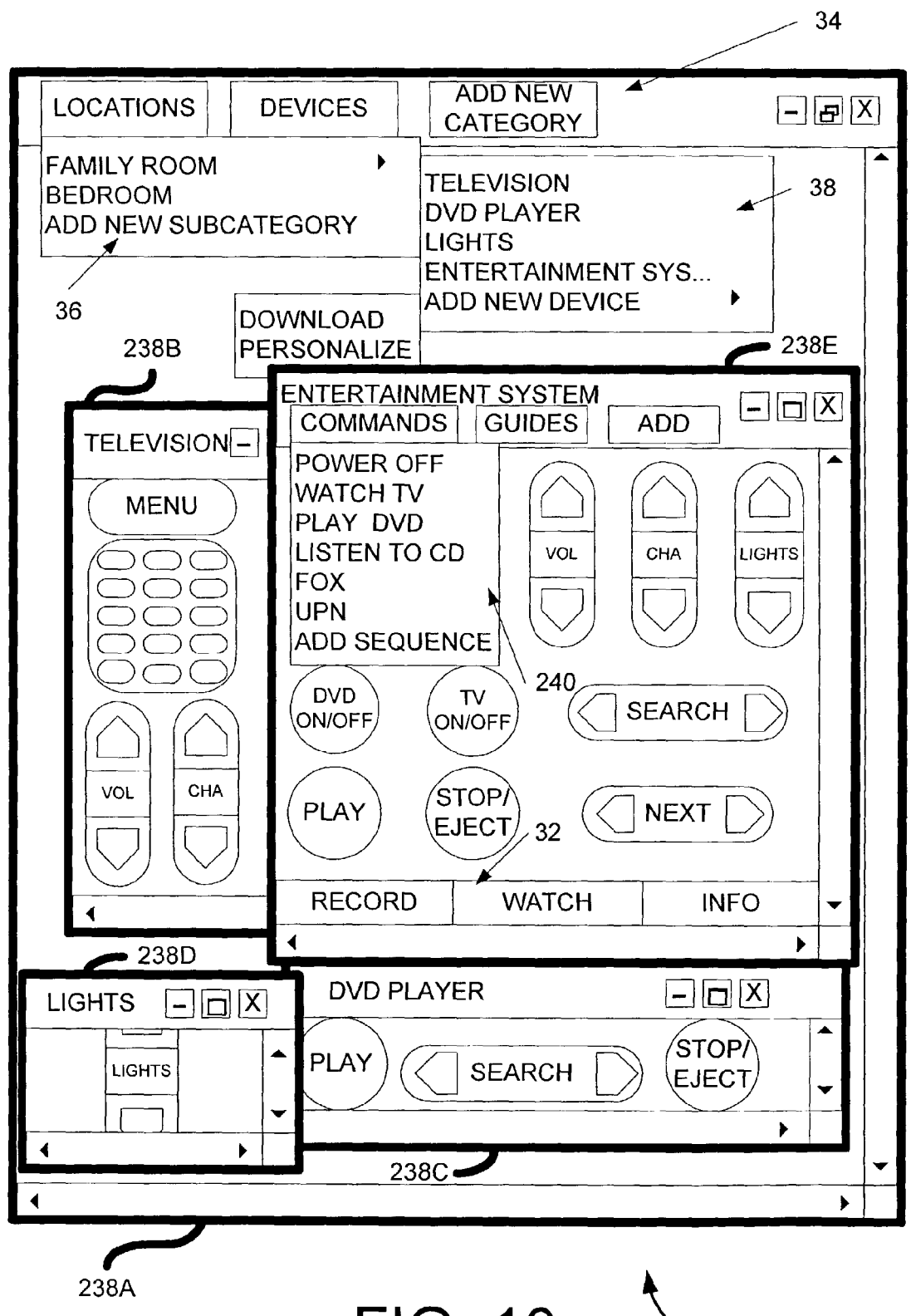
FIG. 10 is a screen shot of an active display depicting group organization and display for user navigation and selection according to the present invention.

Referring to FIG. 10, a screen shot of an active display 24 of the present invention depicts group organization and display for user selection according to manual input and further according to the previous examples. According to one embodiment of the invention, various frames 238A–238E are displayed on active display 24 that permit a user to view and navigate the user defined organized groups. In the present example, frame 238A serves as the primary display portion of the user interface and provides a user with the ability to define and navigate hierarchical categories 34 and sub-categories 36 for organizing command sets and related data as available options 38. In accordance with the previous examples, categories 34 and sub-categories 36 correspond to nodes of the navigable hierarchy defined by the user. Hence, upon selection of the "Location" category, the user accesses "Family Room" and "Bedroom" sub-categories. Upon further selection of the "Family Room" sub-category, the user accesses available options 38 corresponding to command sets for various devices at the location. The user can access stored command sets for devices by selecting the device, as with frames 238B–238C, and/or may store new command sets by downloading them from a source of the command sets and/or importing the command sets from storage elsewhere in the memory of the remote.

The user may further define a new device, as with frame 238E, and drag and drop selected commands from frames 238B–238D. In one embodiment, these selected commands can be assigned to function keys 28 (FIG. 1) of the programmable remote. One way of providing this functionality is to provide a drag and drop key grid that allows a user to assign command buttons to a particular key by dragging the button onto a point of the grid and dropping it there. Further, the assignment thus accomplished may, at an option of the user, cause the selected and assigned commands to be automatically represented on active display 24 as visually corresponding to the assigned function keys in terms of position on the screen in relation to one another. The user may still further add command sequences 240 (FIG. 10) in the manner(s) previously described, and optionally convert a command sequence to a button on the screen. As with other buttons, this command sequence can optionally be assigned to one or more function keys 28 (FIG. 1). Further, a user can store source guides and/or programming guides for convenient reference, optionally accomplishing title-based selection of television programming by using a corresponding source guide as mapping information via channel-station correspondence.

User programmable functions 32 further present an opportunity for a user to define sequences of command sequences. For example, where the DVD player has record capability, a user may define a "Record" function that invokes a state change that readies the DVD player to accept programming information. This "Record" function may further selectively parse programming guide information and/or source guide information to provide needed data while successively changing states of the DVD player to accept the data as programming data. Alternatively or in addition, the data can be automatically converted to DVD player control codes for inputting the data as needed. As a result, a user may select the programmed "Record" function, further select a title of a program in a programming guide, and thereby automatically accomplish recording of the program. Notably, the states of the DVD player may be available as a macro in the command set, but may also be user programmed. Further, a macro or plug-in may be downloaded or imported for parsing and/or converting the programming guide information as required to accomplish this functionality. Similar programmable functions include a "Watch" function for title-based selection of television programs, and an "Info" function for displaying information about a television program as desired. Making these programmable functions change for different user-defined devices also improves personalization.

Figure 11:
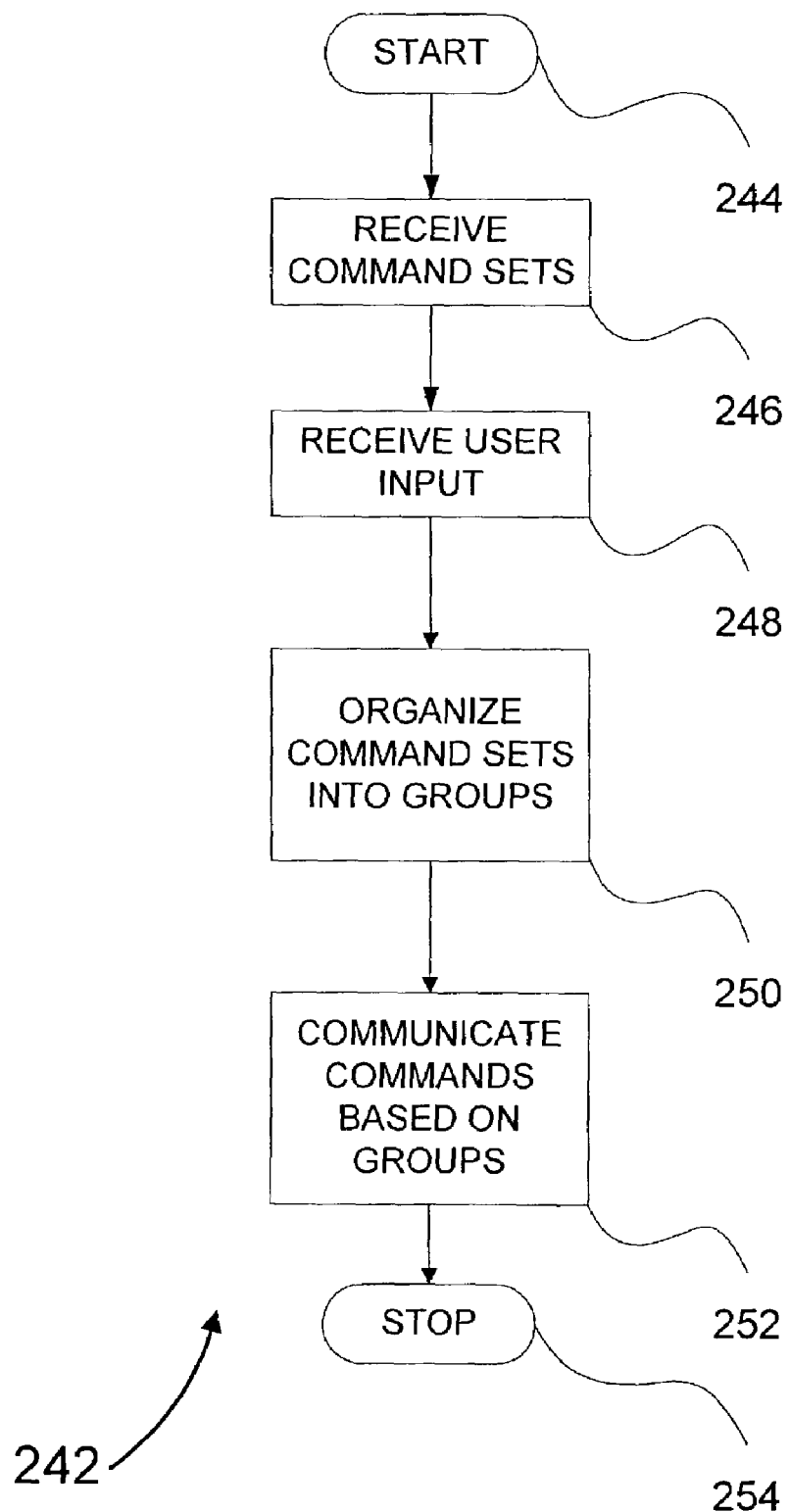
FIG. 11 is a flow chart depicting a method of operation in accordance with the present invention.

Referring to FIG. 11, a method of operation 242 according to the present invention begins at 244 and proceeds to step 246, wherein command sets are received that are operable to control devices. The command sets may be received from a server, a remote controller operable to control the device, and/or the device itself. The command sets may further include and/or be combined with device operability and/or interoperability information. The method of operation 242 then proceeds to step 248, wherein manual input is received from a user, and the command sets are organized into groups based on the manual input at step 250. The manual input may include organization information and/or device operability and/or interoperability information. The organization can take the form of definition of a hierarchy for storing command sets and related information, selection and storage of commands from a plurality of command sets of interrelated devices, and or definition of command sequences, command vectors, and/or sequences of command sequences and/or vectors. The method of operation 242 then proceeds to step 252, wherein the commands are communicated to one or more devices based on the groups. The basis of this communication on the groups can include navigation of a user-defined hierarchy to select a command for output, selection for output of one or more grouped commands of interrelated devices, and/or retrieval of a command sequence for changing one or more states of one or more interrelated devices based on user-defined command sequences and a desired state change. Following communication of the commands at step 252, the method ends at 254.

For illustration, a sample command set for a device is put forth below in a preferred XML implementation.

```
<DEVICE>
    <D_TYPE>Television<\D_TYPE>
    <D_ID>SN00000<\D_ID>
    <D_ALIAS>Bed Room TV<\D_ALIAS>
    <FUNCTION>
        <F_NAME>Power_Switch<\F_NAME>
        <CODE>0000<\CODE>
        <F_SHAPE>Button<\F_SHAPE>
    <\FUNCTION>
    <F_GROUP>
        <FUNCTION>
            <F_NAME>Channel_Up<\F_NAME>
            <CODE>0001<\CODE>
            <F_SHAPE>Up_Arrow<\F_SHAPE>
        <\FUNCTION>
        <FUNCTION>
            <F_NAME>Channel_Down<\F_NAME>
            <CODE>0010<\CODE>
            <F_SHAPE>Down_Arrow<\F_SHAPE>
        <\FUNCTION>
    <\F_GROUP>
    <F_GROUP>
        <FUNCTION>
            <F_NAME>Volume_Up<\F_NAME>
            <CODE>0011<\CODE>
            <F_SHAPE>UpArrow<\F_SHAPE>
        <\FUNCTION>
        <FUNCTION>
            <F_NAME>Volume_Down<\F_NAME>
            <CODE>0100<\CODE>
            <F_SHAPE>Down_Arrow<\F_SHAPE>
        <\FUNCTION>
    <\F_GROUP>
        :
<\DEVICE>
```

This preferred XML implementation contains several optional tags. For example, optional tag <D_ALIAS> can be defined by the user. Also, optional tag <F_SHAPE> indicates a shapes of a button or symbol used to display a function. Further, optional tag <F_GROUP> is useful in identifying a set of commands that must be presented together, such as volume up and volume down. Still further, optional tag <CODES> can be used to assign a sequence of codes to a function. Finally, if a remote controller can control multiple devices at multiple locations, it is highly likely that each device needs a unique identification. Such an ID can be represented by <D_ID> placed after <D_TYPE>. For further illustration, sample grouping using the preferred XML implementation is put forth below, and the following examples use location information and device type, respectively.

```
<!-- Grouping by locations -->
<GROUPING>
    <G_TYPE>Family Room<\G_TYPE>
    <DEVICE>
        <D_TYPE>Television<\D_TYPE>
        :
    <\DEVICE>
    <DEVICE>
        <D_TYPE>VCR<\D_TYPE>
        :
    <\DEVICE>
        :
<\GROUPING>
<!-- Grouping by devices -->
<GROUPING>
    <G_TYPE>TV<\G_TYPE>
    <DEVICE>
        <D_TYPE>Television<\D_TYPE>
        <D_ID>SN00000<\D_ID>
        <D_ALIAS>Bed Room TV<\D_ALIAS>
        :
    <\DEVICE>
    <DEVICE>
        <D_TYPE>Television<\D_TYPE>
        <D_ID>ID00010<\D_ID>
        <D_ALIAS>Family Room TV<\D_ALIAS>
        :
    <\DEVICE>
        :
<\GROUPING>
```

As previously stated, a sequence of commands (a macro) to perform an action, such as programming a VCR, may be downloaded. For purposes of illustration, a sample XML representation that includes defining an action based on key sequences is put forth below, wherein it is assumed that an FM station can be selected by the following command sequence: 1) Get in the FM mode, 2) Get in the direct mode rather than the preset memory mode, and 3) Specify the frequency, wherein "data" indicates frequency information is entered.

```
<DEVICE>
    <D_TYPE>Radio<\D_TYPE>
    <D_ID>SN00000<\D_ID>
    <D_ALIAS>Bed Room Radio<\D_ALIAS>
    <FUNCTION>
        <F_NAME>Power_Switch<\F_NAME>
        <CODE>0000<\CODE>
        <F_SHAPE>Button<\F_SHAPE>
    <\FUNCTION>
    <FUNCTION>
        <F_NAME>FM_Mode<\F_NAME>
        <CODE>0001<\CODE>
        <F_SHAPE>Button<\F_SHAPE>
    <\FUNCTION>
    <FUNCTION>
        <F_NAME>Direct_Mode<\F_NAME>
        <CODE>0010<\CODE>
        <F_SHAPE>Button<\F_SHAPE>
    <\FUNCTION>
        :
```

```
<MACRO>
    <M_NAME>Set_FM_Station<\M_NAME>
    <M_COMMAND>FM_Mode<\M_COMAND>
    <M_COMMAND>Direct_Mode<\M_COMAND>
    <M_COMMAND>data<\M_COMAND>
<\MACRO>
        :
<DEVICE>
```

As further previously mentioned, information sources (stations) only without programming information may be used as source guides, and this information may be received as a source guide or extracted from a received programming guide that contains source information. For example, a user driving a rental car outside of their hometown, may find it difficult to identify a radio station for Jazz quickly without a source guide. Thus, a simple way may be implemented to select and tune into a station from a list of available stations. For illustration, a sample station guide using the preferred XML implementation is put forth below.

```
<STATION_GUIDE>
    <MEDIA>
        <M_TYPE>TV<\M_TYPE>
        <STATION>
            <S_ID>WCBS<STATION_ID>
            <S_TYPE>CBS<\S_TYPE>
            <S_ACCESS>3<\S_ACCESS>
        <\STATION>
              :
        <STATION>
            <S_ID>HBO<STATION_ID>
            <S_TYPE>Movie<\S_TYPE>
            <S_ACCESS>100<\S_ACCESS>
        <\STATION>
              :
    <\MEDIA>
    <MEDIA>
        <M_TYPE>FM RADIO<\M_TYPE>
        <STATION>
            <S_ID>WPBS<STATION_ID>
            <S_TYPE>PBS<\S_TYPE>
            <S_ACCESS>88.1 <\S_ACCESS>
        <\STATION>
              :
        <STATION>
            <S_ID>WROCK<STATION_ID>
            <S_TYPE>ROCK<\S_TYPE>
            <S_ACCESS>100.00<\S_ACCESS>
        <\STATION>
              :
    <\MEDIA>
<\STATION_GUIDE>
```

Similar examples of the above station guide could use <STATION> and related tags only. For further illustration, a corresponding category and option interface for the above station guide is put forth below.

```
TV
    WCBS    CBS
    WABC    ABC
      :
FM
    WPBS    PBS
    WROC    Rock
    WCLA    Classic
      :
```

According to the present invention, a user may automatically activate an appropriate device and tune into a selected station using information obtained from a station guide. This station guide can also be included as a part of a command set. For example, a rental car company can program a car radio to include a station guide for a particular region. It is generally not preferred, however, to include programming information of an electronic program guide in a device specific command set because of flexibility. The remote controller may, however, receive programming guide information and combine these two types of information. Moreover, a program guide does not have to include station related information, which can be provided separately using a station guide. For purposes of illustration, a sample program guide using the preferred XML implementation is put forth below, wherein TV programming is assumed to be available.

```
<PROGRAM_GUIDE>
    <MEDIA>
        <M_TYPE>TV<\M_TYPE>
        <STATION>
            <S_ID>WCBS<STATION_ID>
            <S_TYPE>CBS<\S_TYPE>
            <S_ACCESS>3<\S_ACCESS>
            <PROGRAM>
                <P_TITLE>CBS Evening News<\P_TITLE>
                <P_TYPE>News<\P_TYPE>
                <P_START>2002-02-08T18:30:00.000<\P_START>
                <P_END>2002-02-08T19:00:00.000<\P_END>
                  :
            <\PROGRAM>
              :
        <\STATION>
              :
    <\MEDIA>
<\PROGRAM_GUIDE>
```

The personal programmable universal remote control may possess the ability to access the internet by telephone line, or by communicating with a telephone, a cell phone, a cell tower, or a satellite or broadband network. The greater mobility supplied by some of these methods increases the versatility and ease of application of the invention to all remotely controllable devices regardless of whether an existing remote is available, and not just with those devices capable of communicating their command sets to the personal programmable universal remote control. Continued developments in wireless data transfer, such as Bluetooth technology, may find application to the present invention.

What is claimed is:

1. A personal programmable universal remote control apparatus comprising:
    an input module receptive of command sets operable to control devices;
    an interface module receptive of manual input from a user;
    an organization module operable to organize the command sets into groups based on the manual input, wherein the command sets are device specific, and wherein the groups are location specific, thereby integrating command sets of remotely controllable devices at a particular location into a single, user-defined device system;
    a datastore storing the command sets of multiple devices; and
    a user-defined device definition module allowing a user to instantiate a user-defined device data object and store therein selected commands from the command sets of multiple devices in a user-defined user interface configuration, wherein said interface module allows the user to select commands of the command sets in order to define the user-defined device, and control the multiple devices by interacting with the user-defined interface of the user-defined object in order to send commands to the devices via a wireless output of the apparatus, and wherein said user-defined device definition module allows the user to associate a source guide and a program guide with the user defined-device data object, wherein the source guide provides channel-station correspondence for the particular location and the program guide provides program-station correspondence for the particular location.

2. The apparatus of claim 1 further comprising:
an output module operable to communicate commands to the devices based on the groups.

3. The apparatus of claim 1, wherein the groups are operable to define operating conditions for interrelated devices based on user preference.

4. The apparatus of claim 3, wherein the groups are operable to define operating conditions for interrelated devices based on intelligence regarding device interactions.

5. The apparatus of claim 1, wherein the groups are operable to define a command sequence operable to perform an action requiring one or more devices that involves use of multiple commands of the associated command sets.

6. The apparatus of claim 1, wherein said organization module is operable to organize related functions of multiple devices into a group.

7. The apparatus of claim 6, wherein said organization module has access to interaction information regarding device interactions, and is operable to organize command sets into groups based on the interaction information.

8. The apparatus of claim 7, wherein said organization module is operable to construct the interaction information based on the manual input.

9. The apparatus of claim 1, wherein at least one command set includes a command sequence operable to perform an action of the associated device, wherein the action involves use of multiple commands of the associated command set, and wherein said output module is operable to communicate the multiple commands to the associated device based on the command sequence.

10. The apparatus of claim 1, wherein said input module is operable to receive command sets from the devices.

11. The apparatus of claim 1, wherein said input module is operable to receive command sets from remote control apparatuses operable to control the devices.

12. The apparatus of claim 1, wherein said input module is operable to receive command sets from a server having the command sets stored in memory.

13. A programmable universal remote control apparatus, comprising:
a datastore storing command sets of multiple devices;
a user-defined device definition module allowing a user to instantiate a user-defined device data object and store therein selected commands from the command sets of multiple devices in a user-defined user interface configuration; and
a user interface allowing the user to select commands of the command sets in order to define the user-defined device, and control the multiple devices by interacting with the user-defined interface of the user-defined object in order to send commands to the devices via a wireless output of the apparatus, wherein said user defined-device definition module further allows the user to define command sequences of selected commands, and said user interface allows the user to operate the devices by selecting the command sequence, wherein the command sequences are stored in the form of a state machine of the user-defined device data object a state of the state machine being formed by the user manipulating the devices into a state suitable for interoperability and then saving the state as a user-defined configuration; and wherein said datastore stores said command sets as individual device state machines of the devices, and the user-defined user interface tracks individual states of the devices using the individual device state machines.

14. The apparatus of claim 13, wherein said apparatus and at least one of the devices mutually communicate, and the device at least one of:
(a) confirms that it has changed state as commanded; or
(b) communicates its current state to the apparatus.

15. A programmable universal remote control apparatus, comprising:
a datastore storing command sets of multiple devices;
a user-defined device definition module allowing a user to instantiate a user-defined device data object and store therein selected commands from the command sets of multiple devices in a user-defined user interface configuration, wherein said user defined-device definition module further allows the user to define command sequences of selected commands, and the command sequences are stored in the form of a state machine of the user-defined device data object, a state of the state machine being formed by the user manipulating the devices into a state suitable for interoperability and then saving the state as a user-defined configuration;
a user interface allowing the user to select commands of the command sets in order to define the user-defined device, and control the multiple devices by interacting with the user-defined interface of the user-defined object in order to send commands to the devices via a wireless output of the apparatus, wherein said user interface allows the user to operate the devices by selecting the command sequence; and
a node navigator invoking a command sequence for progressing from a current state reflecting current interoperability of the devices to a desired state selected by the user, wherein edges between nodes of a graph data structure that is the state machine correspond to command sequences for changing from one state to another.

16. The apparatus of claim 15, wherein said node navigator creates the state machine by storing a sequence of commands entered by the user in the process of leaving a defined state and progressing to a newly defined state as a command sequence history, and create a command sequence edge describing the defined state and the newly defined state as neighbors based on the command sequence history.

17. The apparatus of claim 16, wherein said node navigator has an inverse command sequence generator operable to generate an inverse command sequence for returning to the defined state from the newly defined state based on the sequence of commands entered by the user and inverse command information.

18. The apparatus of claim 17, wherein said user interface allows the user to select a set of controls representing inversely related commands, and to provide the inverse relationship information by associating selected commands with inversely related controls the set of controls.

19. The apparatus of claim 17, wherein said node navigator determines the inverse command information by comparing two or more inverse edges of the state machine.

20. The apparatus of claim 16, wherein said node navigator allows the user to name a user defined configuration according to a station, thereby providing a station guide, and to control the devices according to the station guide when the user selects a program from an electronic program guide.

21. The apparatus of claim 16, wherein said node navigator adds a new state to a closest defined state by comparing the command sequence history to edges of the state machine, and navigating the state machine while modifying the command sequence history based on the comparison.

22. The apparatus of claim 16, wherein said node navigator navigates to a defined state of the state machine from an undefined state of the state machine by generating an inverse command sequence using the command sequence history and inverse command information.

23. The apparatus of claim 15, wherein one or more of the devices moves to a pre-defined state or set of states based on a current state of the device and a received command indicating a desired final state, and said user defined-device definition module allows the user to define a user-defined state of a state machine of the user defined-device at least in part by specifying one or more vectors for moving to that state from any other state.

24. A programmable universal remote control apparatus, comprising:
　a datastore storing command sets of multiple devices;
　a user-defined device definition module allowing a user to instantiate a user-defined device data object and store therein selected commands from the command sets of multiple devices in a user-defined user interface configuration; and
　a user interface allowing the user to select commands of the command sets in order to define the user-defined device, and control the multiple devices by interacting with the user-defined interface of the user-defined object in order to send commands to the devices via a wireless output of the apparatus,
　wherein said user interface allows the user to define the user-defined device by drag and drop of selected commands into a screen region representing the user-defined user interface.

25. The apparatus of claim 24, wherein said user interface allows the user to assign selected commands to function keys of said apparatus by providing a drag and drop key grid that allows the user to assign a command button to a particular key by dragging the button onto a point of the grid and dropping it there.

26. The apparatus of claim 25, wherein said user interface causes commands assigned to function keys to be automatically represented on an active display of said apparatus as visually corresponding to the assigned function keys in terms of position on the display in relation to one another.

27. The apparatus of claim 24, wherein said user interface allows the user to define functions that are sequences of command sequences for controlling the devices.

28. A personal programmable universal remote control apparatus, comprising: an organization module operable to organize command sets for remotely controlling devices into groups based on user input, wherein the command sets are device specific, and wherein the groups are location specific, thereby integrating command sets of remotely controllable devices at a particular location into a single, user-defined device system;
　a user-defined device definition module allowing a user to instantiate a user-defined device data object, store therein selected commands from the command sets of multiple devices at the particular location in a user-defined user interface configuration, define command sequences of selected commands, and associate a source guide and a program guide with the user defined-device data object, wherein the source guide provides channel-station correspondence for the particular location and the program guide provides program-station correspondence for the particular location;
　a user interface allowing the user to select commands of the command sets in order to define the user-defined device, control the multiple devices by interacting with the user-defined interface of the user-defined object in order to send commands to the devices via a wireless output of the apparatus, and operate the devices by selecting the command sequence; and
　a node navigator, wherein command sequences are stored in the form of a state machine of the user-defined device data object, a state of the state machine being formed by the user manipulating the devices into a state suitable for interoperability and then saving the state as a user-defined configuration, said node navigator invoking a command sequence for progressing from a current state reflecting current interoperability of the devices to a desired state selected by the user, wherein edges between nodes of a graph data structure that is the state machine correspond to command sequences for changing from one state to another, wherein said node navigator creates the state machine by storing a sequence of commands entered by the user in the process of leaving a defined state and progressing to a newly defined state as a command sequence history, and create a command sequence edge describing the defined state and the newly defined state as neighbors based on the command sequence history.

* * * * *